United States Patent
Kumar et al.

(10) Patent No.: US 11,853,348 B2
(45) Date of Patent: Dec. 26, 2023

(54) MULTIDIMENSIONAL DIGITAL CONTENT SEARCH

(71) Applicant: Adobe Inc., San Jose, CA (US)

(72) Inventors: Akhilesh Kumar, San Jose, CA (US); Zhe Lin, Fremont, CA (US); Ratheesh Kalarot, San Jose, CA (US); Jinrong Xie, Sunnyvale, CA (US); Jianming Zhang, Campbell, CA (US); Baldo Antonio Faieta, San Francisco, CA (US); Alex Charles Filipkowski, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 150 days.

(21) Appl. No.: 16/910,440

(22) Filed: Jun. 24, 2020

(65) Prior Publication Data
US 2021/0406302 A1    Dec. 30, 2021

(51) Int. Cl.
| G06F 16/532 | (2019.01) |
| G06F 16/583 | (2019.01) |
| G06F 16/55 | (2019.01) |
| G06F 16/538 | (2019.01) |
| G06N 3/02 | (2006.01) |
| G06N 20/20 | (2019.01) |

(52) U.S. Cl.
CPC .......... *G06F 16/532* (2019.01); *G06F 16/538* (2019.01); *G06F 16/55* (2019.01); *G06F 16/583* (2019.01); *G06N 3/02* (2013.01); *G06N 20/20* (2019.01)

(58) Field of Classification Search
CPC ...... G06F 16/55; G06F 16/538; G06F 16/583; G06F 16/532

USPC .......................................................... 707/737
See application file for complete search history.

(56) References Cited

U.S. PATENT DOCUMENTS

| 2006/0143647 | A1* | 6/2006 | Bill | G06F 16/683 |
| | | | | 725/10 |
| 2012/0272185 | A1* | 10/2012 | Dodson | H04N 21/4821 |
| | | | | 715/810 |
| 2015/0213331 | A1* | 7/2015 | Peng | G06V 10/761 |
| | | | | 382/165 |
| 2017/0132290 | A1* | 5/2017 | Koch | G06F 16/5854 |
| 2019/0147043 | A1* | 5/2019 | Moskowitz | H04L 51/18 |
| | | | | 704/9 |
| 2020/0012886 | A1* | 1/2020 | Walters | G06F 9/54 |

(Continued)

OTHER PUBLICATIONS

Wei, Zijun et al., "Learning Visual Emotion Representations from Web Data", Jan. 2020, 10 pages.

*Primary Examiner* — Kimberly L Wilson
(74) *Attorney, Agent, or Firm* — FIG. 1 Patents

(57) ABSTRACT

Multidimensional digital content search techniques are described that support an ability of a computing device to perform search with increased granularity and flexibility over conventional techniques. In one example, a control is implemented by a computing device that defines a multidimensional (e.g., two-dimensional) continuous space. Locations in the multidimensional continuous space are usable to different search criteria through different weights applied to the criteria associated with the axes. Therefore, user interaction with this control may be used to define a location and corresponding coordinates that may act as weights to the search criteria in order to perform a search of digital content through use of a single user input.

19 Claims, 11 Drawing Sheets

(56) References Cited

U.S. PATENT DOCUMENTS

2020/0125886 A1\* 4/2020 Baijal .................. H04N 21/439
2020/0327327 A1\* 10/2020 Wu ........................ G06V 20/70

\* cited by examiner

800

Emotion Tag Coordinates on 2D axis

| | |
|---|---|
| Happy | [0.67,1] |
| Delighted | [0.67, 0.67] |
| Excited | [.33, 1] |
| Tense | [-0.33 ,1] |
| Angry | [-0.67 ,0.67] |
| Frustrated | [-1, 0.33] |
| Depressed | [-1, -0.33] |
| Bored | [-0.67, -0.67] |
| Tired | [-0.33, -1] |
| Calm | [0.33, -1] |
| Relax | [0.67, -0.67] |
| Content | [0.67, -0.33] |

*Fig. 8*

MULTIDIMENSIONAL DIGITAL CONTENT SEARCH

BACKGROUND

Search is one of the primary techniques used by a computing device to locate a particular item of digital content from thousands and even tens of millions of instances of digital content. For example, search may be used by a computing device to locate a digital image from millions of stock digital images, an item of digital music from a song repository, a digital movie from thousands of movies available from an online streaming service, and so on. As a result, digital search may be implemented to address situations involving a multitude of items of digital content in ways that are not practically performed by a human.

Search as implemented by a computing device, however, faces numerous challenges, one of which involves an ability to determine a user's intent in a search query and locate digital content that matches that intent. Conventional search techniques, for instance, typically rely on an ability to match text received in a search query with text associated with the digital content. While this technique may work well to locate digital content having particular objects (e.g., for a search query "dog") this technique may fail when confronted with concepts that are not as readily expressed using text, such as emotions, relative quantities of search criteria, and so forth. Thus, conventional search techniques are typically inaccurate and result in inefficient use of computational and network resources caused by repeated attempts to locate a particular item of digital content of interest when confronted with these concepts.

SUMMARY

Multidimensional digital content search techniques are described that support an ability of a computing device to perform search with increased granularity and flexibility over conventional techniques. In one example, a control is implemented by a computing device that defines a multidimensional (e.g., two-dimensional) continuous space. Locations in the multidimensional continuous space are usable to specify weights applied to search criteria associated with the axes. Therefore, user interaction with this control may be used to define a location and corresponding coordinates that may act as weights to the search criteria in order to perform a search of digital content through use of a single user input.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 8 depicts an example of emotion tag coordinates defined with respect to the X axis of pleasant and Y axis of excitement.

DETAILED DESCRIPTION

Overview

Figure 1:
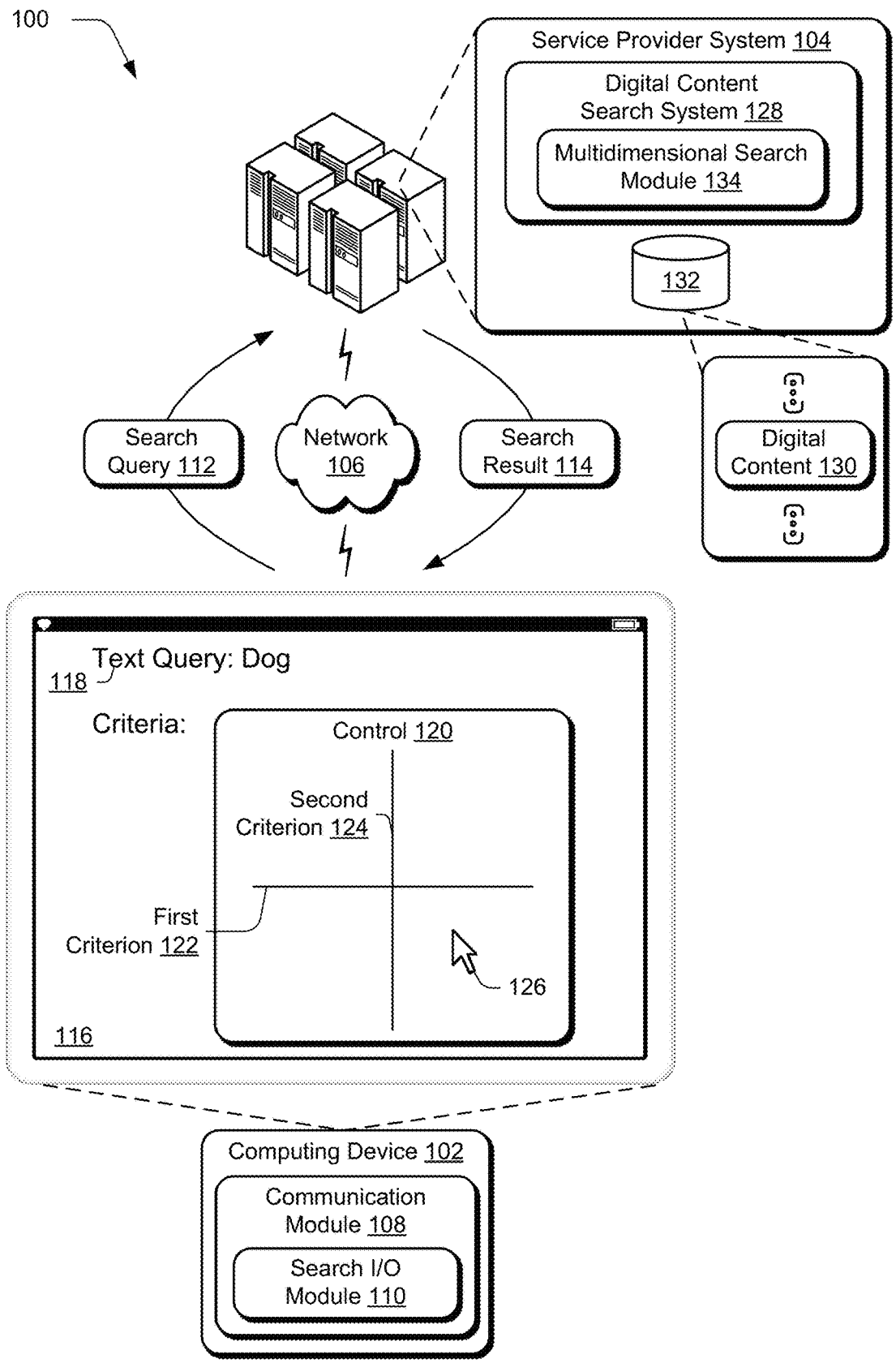
FIG. 1 is an illustration of a digital medium search environment in an example implementation that is operable to employ digital content search techniques.

Search as implemented by computing devices may be used to locate a particular item of digital content from millions of examples in real time. Because of this, search as implemented by computing devices supports an ability for users to interact with this digital content that is not possible otherwise, i.e., is not performable by a human, alone. Conventional search techniques as implemented by computing devices, however, often fail when confronted with concepts that are difficult to express, e.g., textually.

A textual search query of "dog," for instance, may be used by a computing device to locate numerous examples of digital images that are associated with the tag "dog." Similarly, a search for a single emotion along with identification of the object such as "happy dog" may return digital images that have tags of both "dog" and "happy." However, conventional techniques do not support an ability to specify a weight to a search criterion nor weights applied to multiple search criterion together. For example, a search query including "happy enthusiastic dog" or "sad calm girl" will typically fail using conventional search techniques due to an inability to address multiple emotions together and result in inefficient use of network and computational resources.

Accordingly, multidimensional digital content search techniques are described that support an ability of a computing device to perform search with increased granularity and flexibility over conventional techniques. In one example, a control is implemented by a computing device that defines a continuous space involving at least two search criteria. A first axis and a second axis of the control, for instance, may correspond to positive and negative amounts of an excitement emotion and a pleasant emotion, respectively.

In this way, the control defines a multidimensional (e.g., two-dimensional) continuous space. Locations in the multidimensional continuous space are usable to specify weights applied to search criteria associated with the axes. Continuing with the emotion example above, emotions such as happy, delighted, excited, tense, angry, frustrated, depressed, bored, tired, calm, relaxed, and content (i.e., satisfied) may thus be defined by coordinates within this multidimensional continuous space with respect to the emotions "excitement" and "pleasant." Therefore, user interaction with this control may be used to define a location and corresponding coordinates that may act as weights to the search criteria in order to perform a search of digital content through use of a single user input.

Continuing again with the emotion example above, a user input may be received via the control that specifies a location within the multidimensional continuous space defined using positive and negative amounts of excitement and pleasant. The user input, for instance, may specify a location corresponding to an emotion "relax" using the control along with a text input of "dog." The location (e.g., coordinates of the location) and the text input form a search query that is then used to locate digital content (e.g., digital images) that include similar objects (e.g., through use of tags) and that are also associated with similar coordinates within the multidimensional continuous space.

The location corresponding to "relax," for instance, specifies a medium positive amount of pleasant and a medium negative amount of excitement. In this way, the location serves to specify weights within the multidimensional continuous space defined by excitement and pleasant to define emotions that otherwise would be difficult if not impossible to define using conventional techniques. Further, this overcomes the challenges of conventional tag-based approaches that are based on determining agreement between an intent of a user input when searching for digital content and an intent expressed by tags associated with the digital content.

Although digital images and emotions are described in this example, the control is usable to define a variety of other search criteria as part of the multidimensional continuous space, e.g., digital content characteristics such as creation settings (e.g., exposure, contrast), audio characteristics (e.g., timbre, range), and so forth. Further, these search techniques may be leveraged to search for a variety of types of digital content such as digital images, digital movies, digital audio, webpages, digital media, and so forth. Further discussion of these and other examples is included in the following sections and shown using corresponding figures.

In the following discussion, an example environment is first described that may employ the search techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium search environment 100 in an example implementation that is operable to employ digital content search techniques described herein. The illustrated environment 100 includes a computing device 102 communicatively coupled to a service provider system 104 via a network 106, e.g., the Internet. Computing devices that implement the computing device 102 and service provider system 104 may be configured in a variety of ways.

A computing device, for instance, may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as illustrated for the service provider system 104 and as further described in relation to FIG. 11. Although the search techniques are illustrated and described in this example as occurring over a network 106, these techniques may also be implemented locally by the computing device 102, alone.

The computing device 102 is illustrated as including a communication module 108, which is configured to communicate with the service provider system 104 via the network 106. The communication module 108 may be configured as a browser, a network-enabled application, a plug-in module, and so forth. The communication module 108 includes a search input/output (I/O) module 110 that is configured to generate a search query 112 for a search of digital content and output a search result 114 in a user interface 116 resulting from that search.

The user interface 116 in the illustrated example includes a text entry portion 118 via which a user input may be received to specify text as part of the search query 112, e.g., "dog." The user interface 116 also includes a control 120 that includes a representation of a multidimensional continuous space, which in this example is defined with respect to a first criterion 122 associated with a first axis of the control 120 and a second criterion 124 associated with a second axis of the control 120, e.g., as perpendicular to each other. Both the first and second criterion 122, 124 may be defined using positive, neutral, and negative amounts as further described below. The space is continuous in that it defines respective amounts for each of the search criteria, together, at corresponding locations within the space. Thus, a single user input 126 may be used to define a location with respect to both the first and second axis together and corresponding weights to those axes.

The search query 112 that includes the text and the location is illustrated as communicated from the computing device 102 via the network 106 to a digital content search system 128 of the service provider system 104. The digital content search system 128 is configured to search digital content 130 based on the search query 112, and from this, generate the search result 114 for communication back to the computing device 102. Although the digital content 130 is illustrated as stored locally by a storage device 132 of the service provider system 104, the digital content 130 may be maintained elsewhere, e.g., by a third-party system.

The digital content search system 128 includes a multidimensional search module 134 that is representative of functionality to support a search of the digital content 130 by leveraging a multidimensional continuous space represented by the control 120. Each item of digital content, for instance, may be associated with a location (e.g., coordinates) within this multidimension digital space. Therefore, the multidimensional search module 134 may incorporate a relationship between the location specified with respect to this space by the search query 112 with locations specified for respective items of digital content 130. In this way, the digital content search system 128 may support increased granularity and flexibility as part of a search of digital content 130, especially for concepts that are difficult to express textually, such as emotions.

Figure 2:
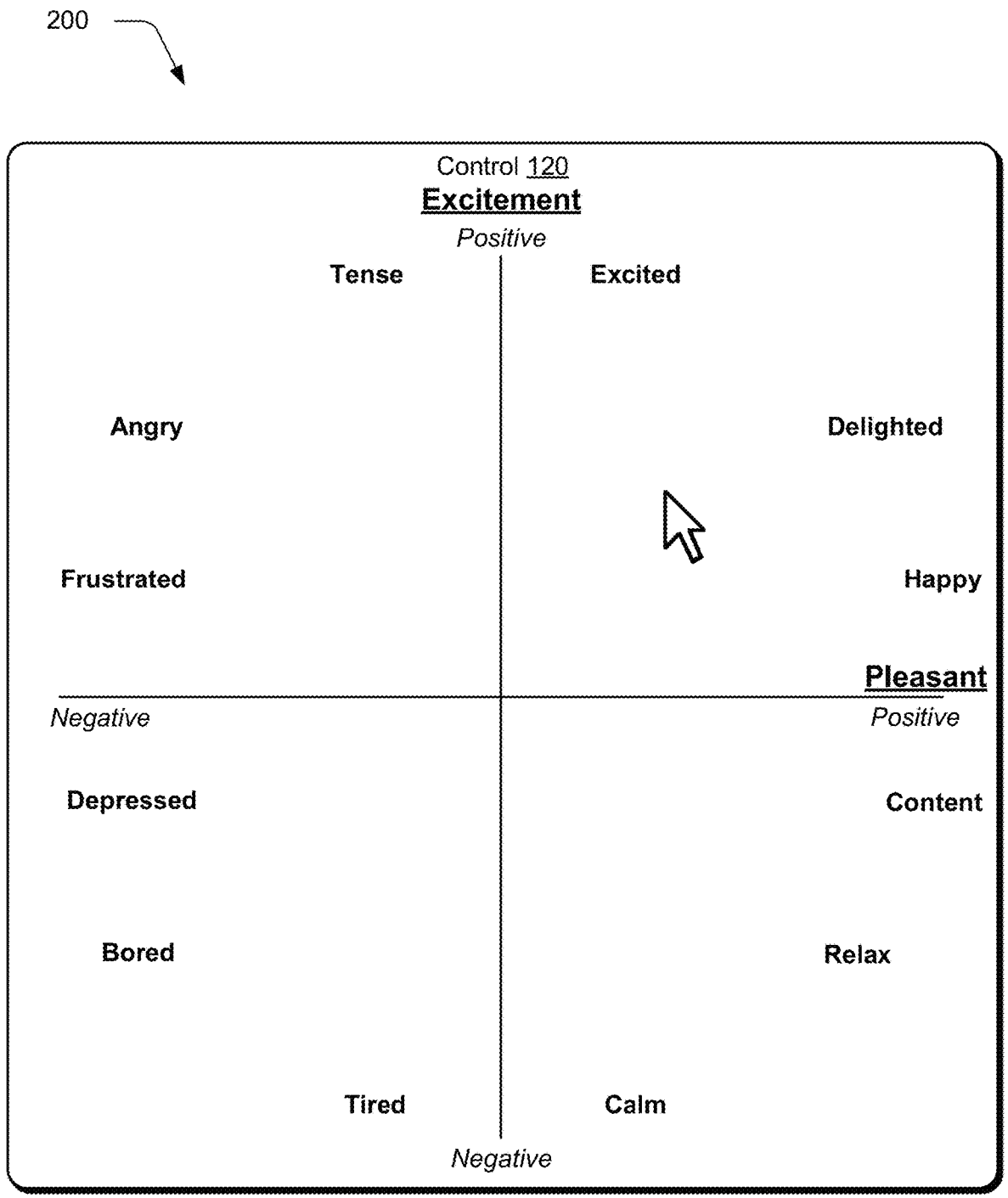
FIG. 2 depicts an example of a control of FIG. 1 as being configured to support a multidimensional continuous space for search using emotions.

FIG. 2 depicts an example 200 of the control 120 of FIG. 1 as being configured to support a multidimensional continuous space for search using emotions. The control 120 supports a user input to continuously specify a strength of at least two search criteria, which in this case are emotion signals of pleasant (P) and excitement (E). This is achieved by mapping "P" and "E" parameters to "X" and "Y" axes on a multidimensional continuous space, which is a two-dimensional (2D) plane in this example. To specify a combination of "P" and "E," a user input is received to specify a location with respect to this representation of the 2D plane, e.g., via a cursor control device as illustrated, a gesture (e.g., a tag, drag), spoken utterance, and so forth received via a user interface. A user input, for instance, may be received to specify a location as a pin, with coordinates of the location then displayed in the user interface.

To further enhance a user experience and promote user intuition regarding the meaning of that location (i.e., the coordinates), text labels are displayed as part of the control 120 that indicate a fine-grained emotion corresponding to respective portions of the 2D plane. The illustrated examples include excited, delighted, happy, content, relax, calm, tired, bored, depressed, frustrated, angry, and tense. Each of these fine-grained emotions corresponds to respective amounts of "P" and "E," which may be positive, neutral, or negative. For example, exited, delighted, and happy are labelled in the top right region of the 2D plane that map to instances in which both "P" and "E" signals are positive. Similarly, depressed, bored, and tired are labelled in the bottom left region to indicate relative negative amounts of both "P" and "E" signals. In this way, user inputs may be provided efficiently to support digital search, further discussion of which is included in the following section and shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Multidimensional Digital Content Search

Figure 3:
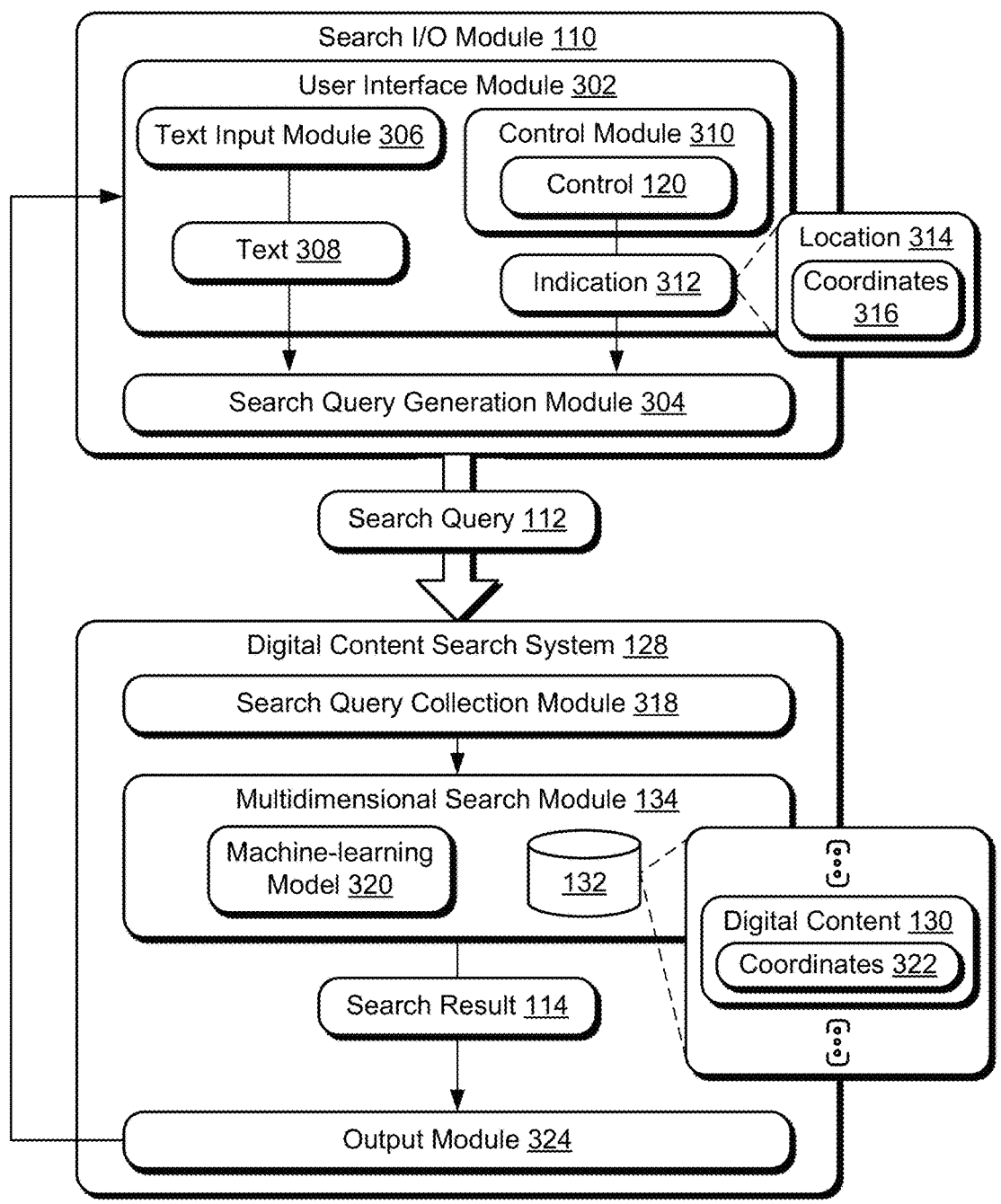
FIG. 3 depicts a system in an example implementation showing operation of a search I/O module and digital content search system of FIG. 1 in greater detail as performing a multidimensional digital content search.
Figure 4:
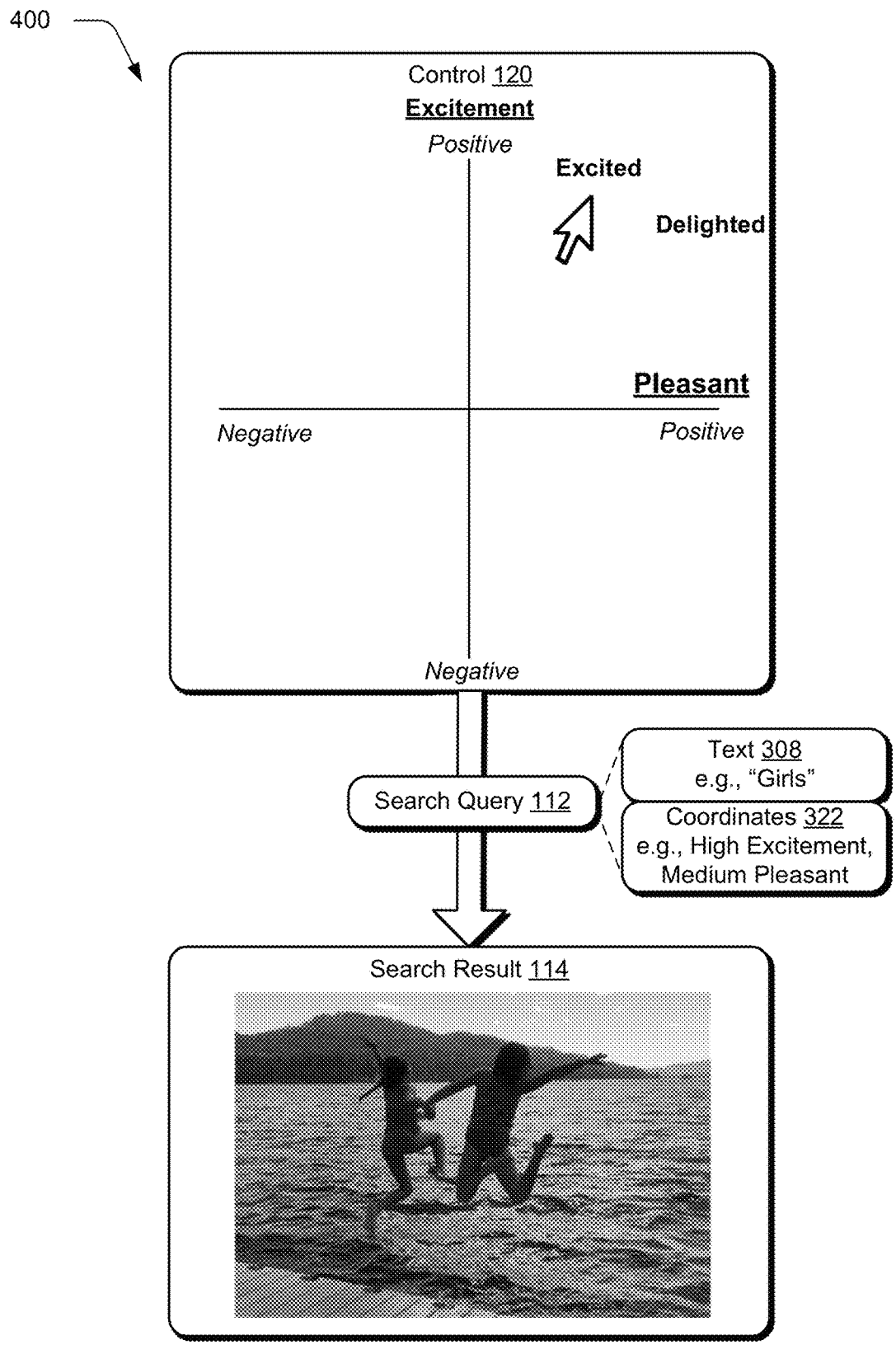
FIG. 4 depicts an example of a multidimensional digital content search involving emotion.
Figure 5:
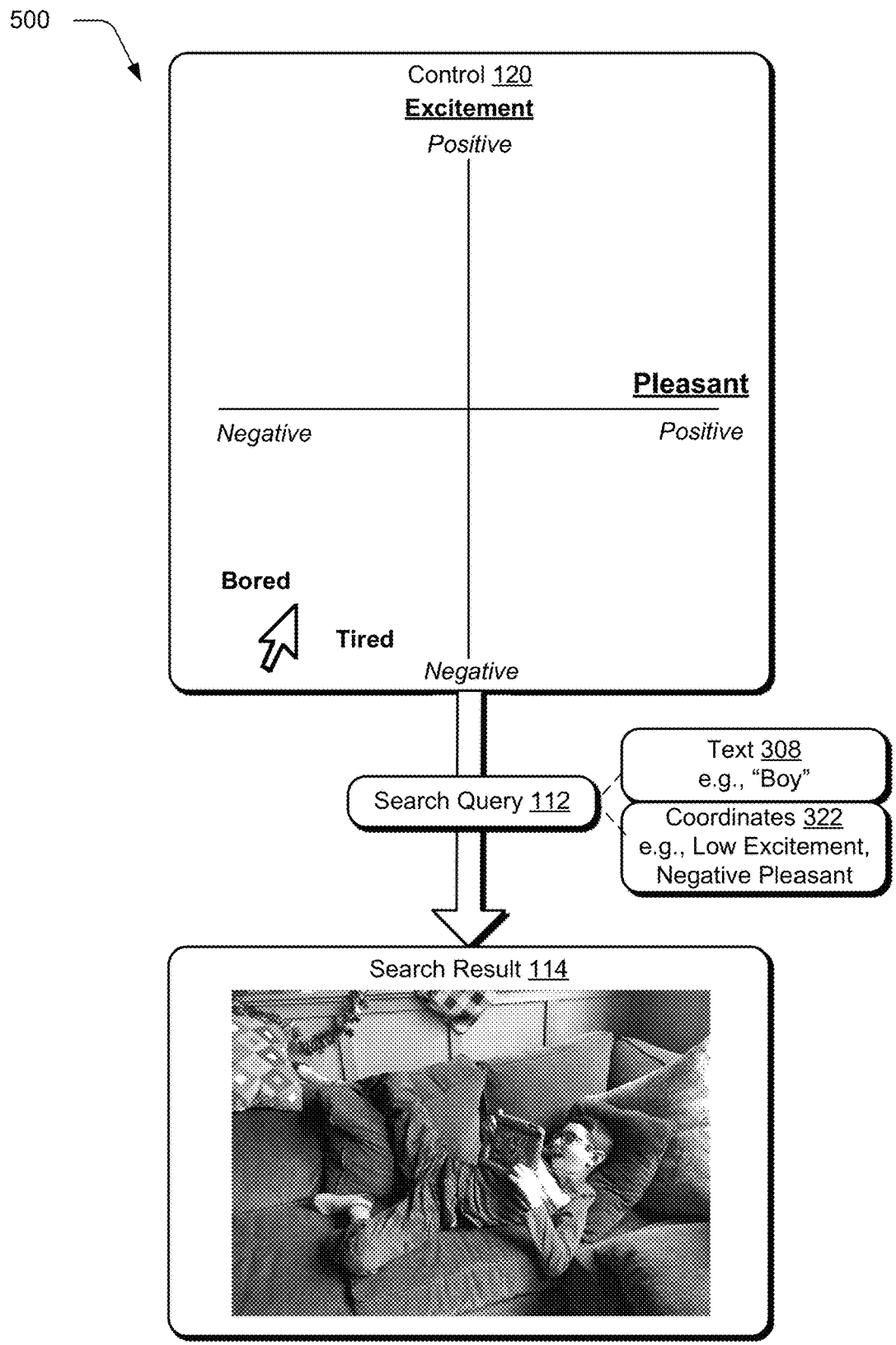
FIG. 5 depicts another example of a multidimensional digital content search involving emotion.
Figure 6:
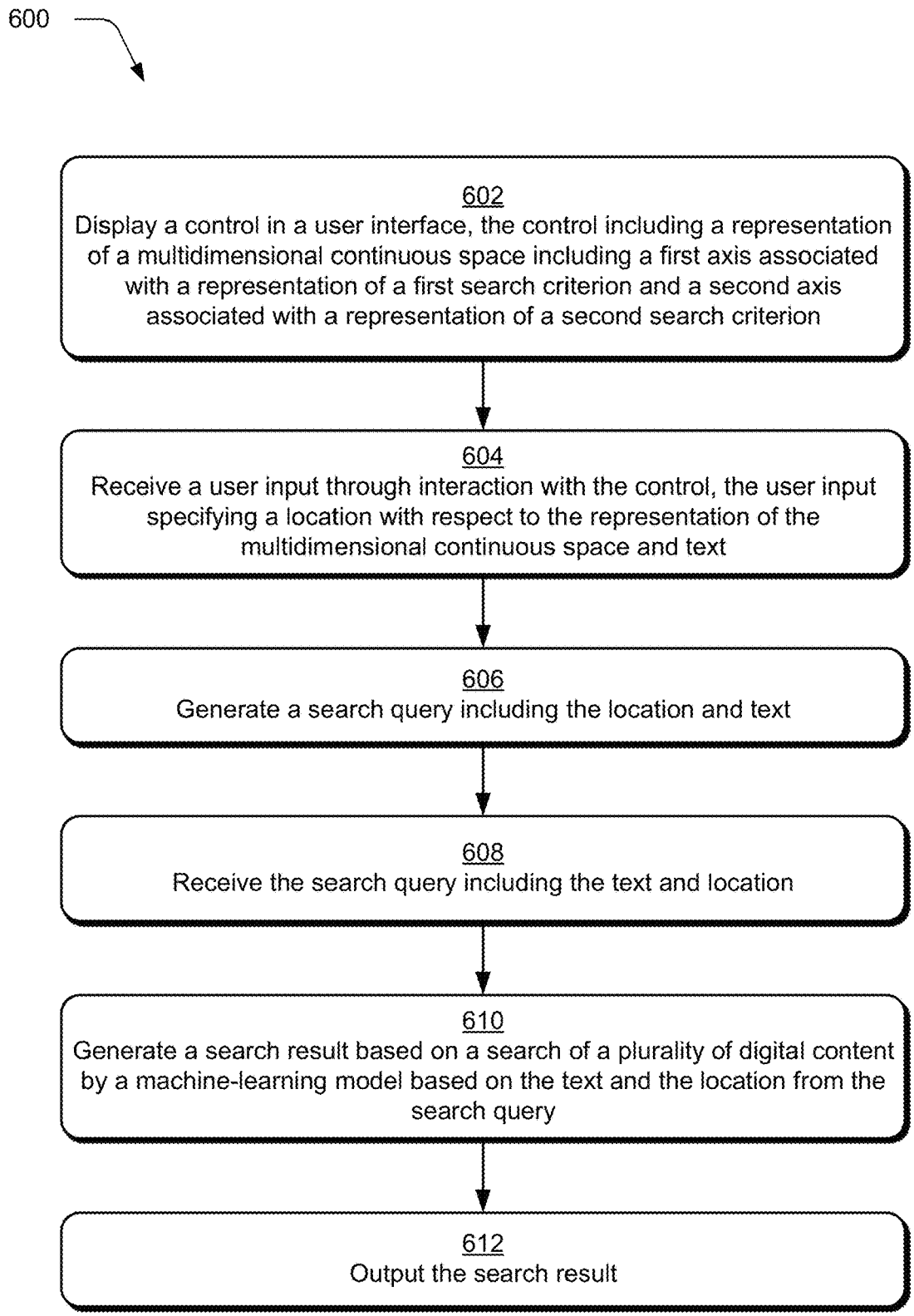
FIG. 6 is a flow diagram depicting a procedure in an example implementation in which a control including a representation of a multidimensional continuous space is leveraged as part of digital content search.

FIG. 3 depicts a system 300 in an example implementation showing operation of the search I/O module 110 and digital content search system 128 of FIG. 1 in greater detail as performing multidimensional digital content search. FIG. 4 depicts an example 400 of a multidimensional digital content search involving emotion. FIG. 5 depicts another example 500 of a multidimensional digital content search involving emotion. FIG. 6 depicts a procedure 600 in an example implementation in which a control including a representation of a multidimensional continuous space is leveraged as part of digital content search.

The following discussion describes search techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference is made interchangeably to FIGS. 1-6.

To begin in this example, the search I/O module 110 as illustrated in FIG. 3 includes a user interface module 302 and a search query generation module 304. The user interface module 302 is configured to output the user interface 116 of FIG. 1. As part of this, the user interface module 302 includes a text input module 306 that is configured to receive a user input to specify text 308, e.g., via a text entry portion 118. The user interface module 302 also includes a control module 310 that is configured to display the control 120 in the user interface 116.

The control 120 includes a representation of a multidimensional continuous space including a first axis associated with a representation of a first search criterion and a second axis associated with a representation of a second search criterion (block 602) as shown in FIG. 1. As shown in FIG. 2, the first and second search criteria may correspond to emotions, such as pleasant and excitement respectively.

A user input is then received through interaction with the control 120. The user input provides an indication 312 of a location 314 (e.g., coordinates 316) defined with respect to the multidimensional continuous space. The user input also includes text 308 (block 604). Text 308, for instance, may be received through a text entry portion 118 output by the text input module 306, such as "dog" entered using a keyboard, spoken utterance, gesture, and so on. An indication 312 may also be received as specifying a location 314 (e.g., coordinates 316) defined with respect to a representation of the multidimensional continuous space defined by the control 120, e.g., by "clicking" on a location using a cursor control device, tap gesture, and so on.

As shown in the example 400 of FIG. 4, for instance, a search query 112 may include the text 308 "girls." The search query 112 also includes coordinates 322 defined in relation to the representation of the multidimensional continuous space of the control 120 output by the control module 310, which in this instance indicates a location near "excited" and "delighted" to indicate a high amount of "excitement" and a medium amount of "pleasant." In the example 500 of FIG. 5, on the other hand, a search query 112 includes the text 308 "boy." The search query 112 also includes coordinates 322 defined in relation to the multidimensional continuous space of the control 120 output by the control module 310 which indicates a location near "bored" and "tired" to indicate a relatively low amount of "excitement" and a negative amount of "pleasant." Thus, in both instances the coordinates 322 specify weights, either positive or negative, to be applied to both emotions through a single user input.

The text 308 and indication 312 are then output by the user interface module 302 to a search query generation module 304. The search query 112 is generated by the search query generation module 304 based on the location 314 (e.g., coordinates 316 with respect to the multidimensional continuous space) and text 308 (block 606) from the user input. The search query 112 is then communicated to and received by a search query collection module 318 of the digital content search system 128 (block 608). This may be performed remotely using the network 106 or locally at a single computing device 102 as previously described.

The search query 112, as collected by the search query collection module 318, is employed by the multidimensional search module 134 to generate a search result 114. The search result 114 is based on a search of a plurality of digital content 130 by a machine-learning model 320 based on the text 308 and the location 314 from the search query 112 (block 610). The machine-learning model 320, for instance, may be configured as an ensemble model as further described in relation to FIG. 7 that includes an image model and a tag-based model. The ensemble model is thus usable to generate coordinates 322 for respective items of digital content 130. In this way, the text 308 and coordinates 316 from the indication 312 of the location 314 from the search query 112 may be used to locate digital content 130 having similar text and coordinates. The search result 114 is then output (block 612) by an output module 324. In this way, the multidimensional search module 134 supports increased flexibility and granularity over conventional techniques.

Continuing with the first example 400 of FIG. 4, a search query 112 may include the text 308 "girls." The search query 112 also includes coordinates 322 defined in relation to the representation of the multidimensional continuous space of the control 120 output by the control module 310 that indicates a location near "excited" and "delighted" to define a relatively high positive amount of "excitement" and a medium positive amount of "pleasant." Accordingly, a search result 114 is generated by the multidimensional search module 134 that includes a digital image in this example showing girls having a high amount of excitement and a medium amount of pleasant based on coordinates assigned to the digital image, e.g., jumping off a dock with hands raised in the air.

Likewise, in the example 500 of FIG. 5, a search query 112 includes text 308 of "boy." The search query 112 also includes coordinates 322 defined in relation to the multidimensional continuous space of the control 120 output by the control module 310 which indicates a location near "bored" and "tired." This indicates a relatively low negative amount of "excitement" and a low negative amount of "pleasant." Accordingly, a search result 114 is generated by the multidimensional search module 134 that includes a digital image associated with text 308 of "boy" and coordinates 322 showing a boy that exhibits a low amount excitement and pleasantness, e.g., a boy laying on a couch staring at a tablet. As a result, the multidimensional continuous space supports search techniques with greater computational efficiency and accuracy than what was previously possible. Further discussion of an Implementation Example is included in the following section and shown using corresponding figures which includes additional details regarding configuration of digital content to support multidimensional continuous search and use of the digital content as part of the search.

Implementation Example

In this implementation example, the control 120 is configured to support emotion-based digital image search. Emotion-based image search is a powerful tool that is usable by a computing device to find digital images which trigger respective emotions. Different digital images, for instance, may invoke different emotions to human beings. In this case, the emotions of "pleasant" and "excitement" are used as a basis to define additional emotions through use of a multi-dimensional continuous space.

Conventional search solutions are based on tag-based approaches where the search is limited to single emotions as part of the search query, such as "happy child," or "angry child." Conventional tag-based search, for instance, works well if there is single emotion attached to the subject but does not work well with more granularity and flexibility. For example, "happy child", "sad girl" works well with tag-based search, however, conventional techniques do not support a search, with an acceptable degree of accuracy, for multiple terms together such as "happy enthusiastic child" or "sad calm girl". Further conventional techniques do not support an ability to attach the weight to terms expressing emotions, nor do so together. For example, conventional techniques do not support an ability to specify the weight of happiness or enthusiasm in a search like "happy enthusiastic child".

Accordingly, the techniques described herein support an ability to search for digital images that have emotions of varying degrees associated with them. Thus, these techniques support a user experience with increased efficiency and accuracy in order to perform a search of digital images as further described below. As previously described, the multidimensional search module 134 supports a search by leveraging a multidimensional continuous space. In this example, this space is used to conceptualize and define human emotions by defining where these emotions lie within that space, e.g., in a two-dimensional grid.

Figure 7:
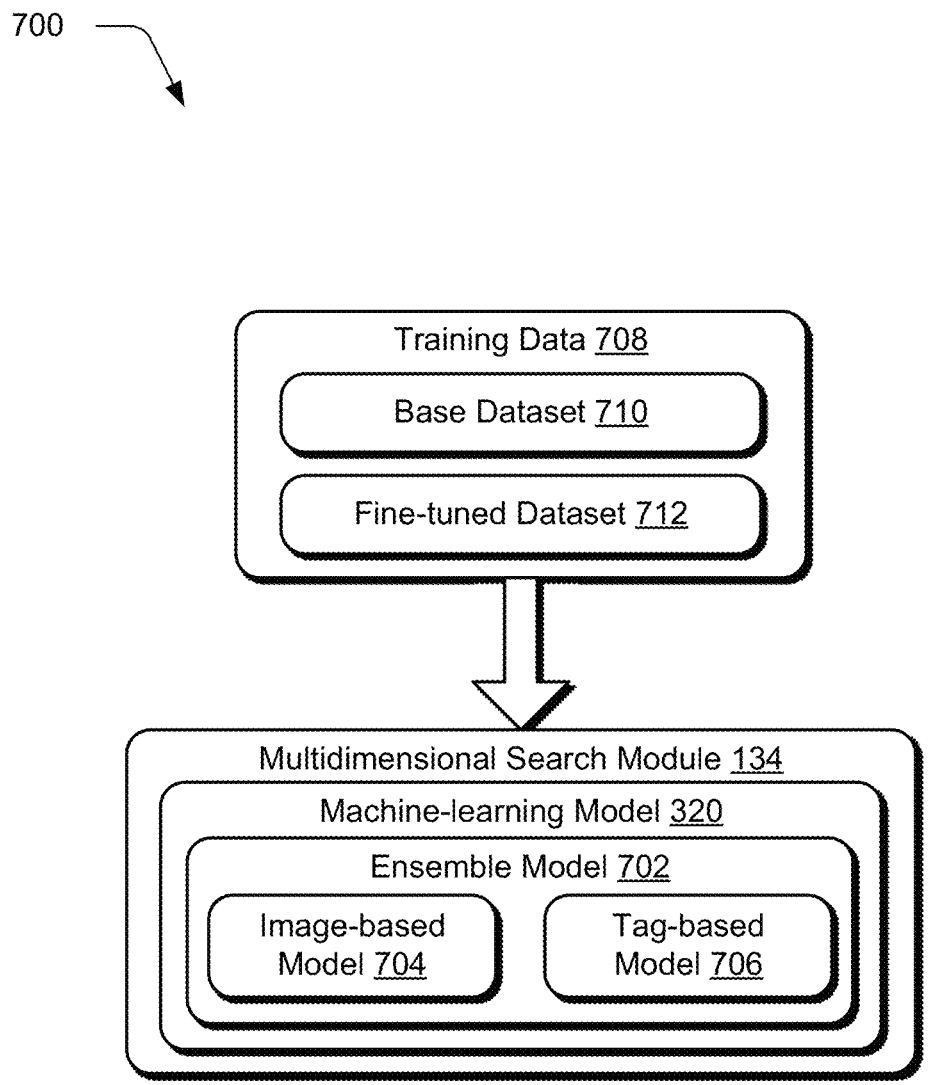
FIG. 7 depicts a machine-learning model of FIG. 3 in greater detail as an ensemble model that includes an image model and a tag-based model.

FIG. 7 depicts an example implementation 700 of the machine-learning model 320 of the multidimensional search module 134 of FIG. 3 in greater detail. In this example, the machine-learning model 320 is implemented as an ensemble model 702 that includes an image-based model 704 and a tag-based model 706.

The image-based model 704 is trained in two phases. First, a base model is trained based on a relatively large quantity of weakly supervised digital images using training data 708 from a base dataset 710. The base model is then "fine-tuned" using a fine-tuned dataset 712 to generate the image-based model 704.

In this example, the base model of the image-based model 704 is formed using a Resnet50 architecture. Training a machine-learning model to recognize emotions in a digital image involves a large dataset. To address this issue, a weakly derived large-scale base dataset 710 is curated that includes more than a million digital images covering diverse emotions concepts related to humans, scenes and symbols. Part of this base dataset 710 may be incomplete and noisy, e.g., the digital image includes few tags or incomplete tags or tags that are not relevant or loosely related to the digital image. Because the representation of the visual data and textual data are to be semantically close to each other, correlating information in the tags and the digital images acts to regularize the image representation. Hence training is performed in this example on joint text and visual information of the digital image.

The base dataset 710 uses six hundred and ninety emotion related tags as labels giving a diverse set of emotion labels, circumventing difficulty in manually obtaining emotion annotations. The base dataset 710 is used to train a feature extraction network of the image-based model 704 which is further regularized using joint text and visual embedding and text distillation. This model gives a 690-dimension probability score for 690 tags (main task) and a 300-dimension feature vector (main task). An eight-dimension probability score for eight categories (auxiliary task) is also trained. The model is trained using multi-task losses for the three tasks above.

For the fine-tuned dataset 721, twenty-one thousand digital images are collected, each labeled based on the two search criteria (e.g., two axes) for twenty-five values from −2, −1, 0, +1, +2 on each dimension. This annotation is performed independently along each axis. To finetune the base model with this fine-tuned dataset 712, the last layer from the base model is removed and a fully-connected layer is added at a head of the base model with an output mapping to class with two scores. Multi-class logarithmic loss is used to train the model as shown below:

$$logloss = \frac{1}{N}\sum_i^N \sum_j^M y_{ij}\log(p_{ij})$$

For the tag-based model 706, a stock dataset of the training data 708 includes 140 Million digital images with weak tags, e.g., text labels at least partly supplied by a user. Each digital image also includes a variable number of tags. To find the coordinate for each digital image within the multidimensional continuous space, coordinates are assigned for each of the emotion tags based on this space, e.g., using 2D axis based on their position on 2D grid.

In the illustrated example 800 of FIG. 8, for instance, emotion tag coordinates may be defined with respect to the X axis of pleasant and Y axis of excitement. For example, the emotion and corresponding coordinates may include the following:

Happy [0.67,1]
Delighted [0.67, 0.67]
Excited [0.33, 1]
Tense [−0.33,1]
Angry [−0.67,0.67]
Frustrated [−1, 0.33]
Depressed [−1, −0.33]
Bored [−0.67, −0.67]
Tired [−0.33, −1]
Calm [0.33, −1]
Relax [0.67, −0.67]
Content [0.67, −0.33]

Figure 9:
FIG. 9 depicts an example of tags associated with a digital image.

Accordingly, consider an example 900 of FIG. 9 in which the digital image 902 includes the following tags 904.

Happy
Child
Parents
Sunny
Joy
Grass
Relax
Playing
Evening
Sky
Trees
Covered
Sunlight
Mother
Outdoors In this example, the digital image 902 is associated with fifteen tags. However, out of these tags, three tags (1) Happy, (2) Joy, and (3) Relax denote emotions. Accordingly, the coordinates may be assigned for each of these tags, individually, and/or for the digital image 902 as a whole.

For the digital image 902 as a whole, for instance, first the tags associated with the digital image 902 are matched with tags from the example of FIG. 8 (e.g., using natural language processing, vectors in a word2vec space, and so on) and corresponding coordinates are obtained. The emotions "Happy" and "Joy," for instance, may be mapped to tag 'Happy' in the table. Similarly, the emotion "Relax" may be mapped to "Relax" in the table.

Next, two sets of coordinates are obtained "[0.67,1]" corresponding to "Happy" and "[0.67, −0.67]" corresponding to "Relaxed." The coordinates of the digital image 902 as a whole are then calculated as mean of the coordinates as [(0.67+0.67)/2, (1+(−0.67))/2]=[0.67, 0.16]. The resulting coordinates [0.67, 0.16] are assigned as the location of the digital image 902 within the multidimensional continuous space. So, in this case the digital image 902 lies somewhere in the first quadrant.

Figure 10:
FIG. 10 depicts another example of tags associated with a digital image.

Likewise, consider an example 1000 of FIG. 10 in which the digital image 1002 includes the following tags 1004.

Bored
Delighted
Calm
Family
Couple

Here three tags out of five are related to emotion, i.e., "Bored," "Delighted," and "Calm." These emotions correspond to coordinates [−0.67, −0.67], [0.67, 0.67] and [0.33, −1] respectively. Accordingly, the coordinates associated with the digital image 1002 as a whole may be calculated as follows:

$$[((-0.067)+(0.67)+(0.33))/3,((-0.67)+(0.67)+(-1))/3]$$
$$=[0.11,-0.33]$$

So, in this case the digital image 10002 lies somewhere in the fourth quadrant.

The image-based model 704 and the tag-based model 706 form an ensemble model 702 that is employed by the multidimensional search module 134. In one example, equal weight is assigned to both models and as such the final model is represented as M.

$$M=l*m1+(1-l)*m2$$

where "m1" is the image-based model 704, "m2" is the tag-based model 706, and l=0.5, which in practice was found to give optimal results.

The output of the Resnet based Image model is [0.75, 0.67] and the output of the tag-based model is [0.67, 0.16]. The output of the ensemble model 702 for l=0.5 can be calculated as 0.5*[0.75, 0.67]+(1−0.5)*[0.67, 0.16]=[0.71, 0.41]. Some digital images in the training dataset may not include emotion tags. In such instance, l=1 is assigned and the output of the ensemble model becomes $$M=m1$$

where "m1" is a Resnet-based Image model. The output of the ensemble model 702 is a score of formats [x, y] where score is between [−1,1] for both X and Y axes. These [x, y] coordinates also correspond to points in the multidimensional continuation space.

An elastic search index may be employed by the multidimensional search module 134 in which the coordinates are generated offline in order to support real time operation when receiving a search query 112 in order to generate a search result 114. To do so, an infrastructure of the multidimensional search module 134 may include an analyzer and an elastic search index. The analyzer is used as part of setup where the ensemble model is deployed as a web service inside a docker container. Further, this analyzer can be scaled to allocate sufficient resources for indexing millions of digital images in a short amount of time.

The elastic search index is an indexed based on elastic search that can be queried to return digital content 130 (e.g., digital images) that are closest to a location specified as part of the search query 112 based on L2 distance. To create the index, a product quantization technique is utilized which involves compressing the feature embeddings, bucketizing (clustering) and assigning to one of 1 k buckets. A pre-built inverted ES index allows retrieval of the digital content 130 in real time.

For compressing the dimension of the image's feature vector and calculating a PQ code, the following operations may be performed. First, an embedding space is subdivided into subspaces of 8 bits each. Each byte denotes a bucket identifier of the elastic search index. From a nearest neighbor's search perspective, each byte denotes the centroid of the cluster in KNN. Each subspace-vector of embedding is then encoded with an ID of nearest cluster (bucket). A PQ code is calculated using the subspace IDs, and the PQ code and Bucket ID are stored as inverted index in the elastic search.

Once the inverted ES index is setup. The result can be retrieved in following mechanism.
1. User makes a query using the 2D grid;
2. The analyzer mentioned translates the query and output is sent to a PQ-codes plugin;
3. PQ code plugin compares the input vector with subspace ID and returns the nearest subspace ID based on L2 distance. This is an example of Approximate Nearest Neighbor's Search.
4. Digital content 130 from the bucket(s) associated with subspace ID are used to generate the search result 114; and
5. Reverse index can be used to limit search to nearest N bucket.

In this way, real time search may be implemented as part of the multidimensional digital content search techniques as described herein.

For example, in an instance in which 180 million digital images may be processed (e.g., as part of a stock digital image service), some areas of the multidimensional continuous space may be dense, while other may be sparse. Therefore, in order to increase efficiency in operation of a computing device that performs the search, this may be implemented by not searching for the closest digital image in the space, directly. A search for a "happy child," for instance, may result in ten million digital images as part of the search result 114. Therefore, in order to increase efficiency of the process, the digital image locations within the multidimensional continuous space are precomputed and clustered into bins and searched are made based on those bins, e.g., a centroid.

The multidimensional continuous space (e.g., 2D space illustrated in FIG. 2), may be divided into boxes, and top "X" (e.g., 1000) digital images within that box are located, resulting in increased efficiency as part of a local neighborhood search. Further, the search result 114 as output in the user interface 116 may include a density map to show "where things area" with respect to the representation of the multidimensional continuous space, e.g., as an availability heat map. Further, grid size may change in that regions used to represent different emotions based on an amount of digital content assigned to that region and may support "zoom" to support different levels of granularity. Other examples are also contemplated without departing from the spirit and scope of the present invention.

Example System and Device

Figure 11:
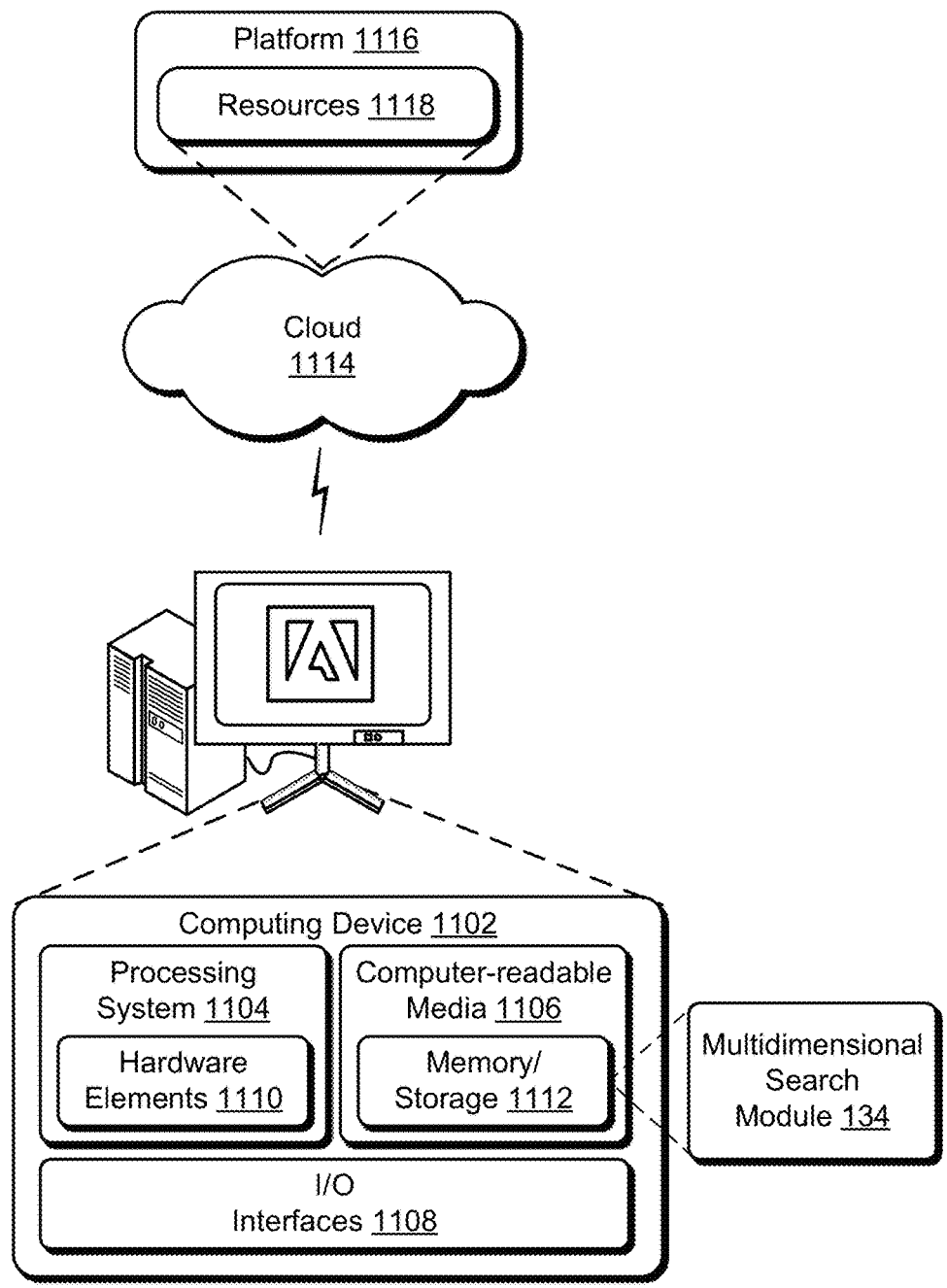
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the multidimensional search module 134. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method implemented by a computing device, the method comprising:
　receiving, by the computing device via an input provided by a user, a search query including:
　　a text query; and
　　an indication of a location with respect to a multidimensional continuous space, the multidimensional continuous space defined using a first axis corresponding to a first emotion and a second axis corresponding to a second emotion;

searching, by the computing device, a plurality of digital images based on the text query and the indication of the location, the searching performed using a machine-learning model configured as an ensemble model that includes an image-based model and a tag-based model, the image-based model trained on joint text and visual information and the tag-based model trained on digital images each having one or more emotion-based tags;

generating, by the computing device, a search result based on the searching; and outputting, by the computing device, the search result.

2. The method as described in claim 1, wherein the first axis corresponds to excitement or enthusiasm and the second axis corresponds to pleasantness or happiness.

3. The method as described in claim 1, wherein the first axis and the second axis define positive and negatives amounts for the first emotion and the second emotion, respectively, within the multidimensional continuous space.

4. The method as described in claim 1, wherein the indication of location specifies weights assigned to the first and second emotions, respectively.

5. The method as described in claim 1, wherein the one or more emotion-based tags each have assigned coordinates in the multidimensional continuous space.

6. The method as described in claim 1, wherein the indication is generated by receiving a user input via a control output in a user interface, the user input indicating the location with respect to a representation of the multidimensional continuous space displayed as part of the control.

7. The method as described in claim 1, wherein the indication of the location is specified using coordinates with respect to the multidimensional continuous space.

8. The method as described in claim 7, wherein the multidimensional continuous space includes at least two dimensions.

9. A system comprising:
a search query collection module implemented at least partially in hardware of a computing device to receive a search query via an input provided by a user, the search query including:
a text query; and
coordinates specified with respect to a multidimensional continuous space;
a multidimensional search module implemented at least partially in hardware of the computing device to generate a search result based on a search of a plurality of digital images based on the search query using a machine-learning model configured as an ensemble model that includes an image-based model and a tag-based model, the image-based model trained on joint text and visual information and the tag-based model trained on digital images each associated with one or more emotion-based tags having assigned coordinates in the multidimensional continuous space; and
an output module implemented at least partially in hardware of the computing device to output the search result.

10. The system as described in claim 9, wherein, during training, the ensemble model assigns a location in the multidimensional continuous space for respective said digital images based on the assigned coordinates of the one or more emotion-based tags for respective said digital images.

11. The system as described in claim 9, wherein the multidimensional continuous space defines respective amounts of at least two emotions.

12. The system as described in claim 9, wherein a first axis and a second axis define positive and negatives amounts for first and second search criteria, respectively, within the multidimensional continuous space.

13. The system as described in claim 9, wherein the coordinates specify weights assigned to first and second emotions, respectively, within the multidimensional continuous space.

14. The system as described in claim 9, wherein the coordinates are generated by receiving a user input via a control output in a user interface, the user input indicating a location of the coordinates with respect to a representation of the multidimensional continuous space displayed as part of the control.

15. A method implemented by a computing device, the method comprising:
receiving, by the computing device, a plurality of digital images;
generating, by the computing device, a plurality of coordinates with respect to a multidimensional continuous space, respectively, for the plurality of digital images, the generating including:
locating a plurality of emotion-based tags associated with the plurality of digital images, respectively;
generating a plurality of coordinates, respectively, for the plurality of emotion-based tags; and
calculating the plurality of coordinates of the plurality of digital images as a whole based on the generated plurality of coordinates for the emotion-based tags for respective said digital images; and
training, by the computing device, a machine-learning model based on:
the plurality of digital images; and
the plurality of coordinates of the plurality of digital images as a whole.

16. The method as described in claim 15, wherein the machine-learning model is an ensemble model.

17. The method as described in claim 16, wherein the ensemble model includes an image-based model and a tag-based model.

18. The method as described in claim 15, further comprising:
searching the plurality of digital images based on a search query using the trained machine-learning model; and
outputting a search result of the searching.

19. The method as described in claim 18, wherein the search query includes a digital image and a coordinate.

* * * * *